Nov. 13, 1951 W. A. MENDELSOHN 2,574,749
CLIP-ON SUNGLASSES
Filed Aug. 9, 1947
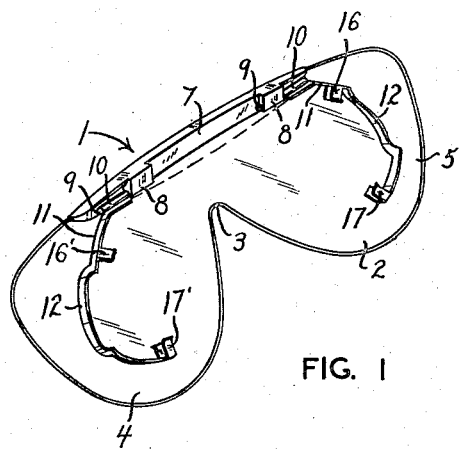
INVENTOR
WILLIAM A. MENDELSOHN
ATTORNEY Patented Nov. 13, 1951

2,574,749

UNITED STATES PATENT OFFICE 2,574,749

CLIP-ON SUNGLASSES

William A. Mendelsohn, Chicago, Ill.

Application August 9, 1947, Serial No. 767,813

4 Claims. (Cl. 2—13)

This invention relates in general to sunglasses and, more particularly, to sunglasses adapted to fit upon, and be supported by, a pair of spectacles, or "clip-on" sunglasses, as they are commonly called.

It is the primary object of the present invention to provide sunglasses of the clip-on type having unique clipmeans for engaging the spectacle in such a manner that the sunglasses may, at the option of the wearer, be swung down into, or up out of, the line of vision, and will, when in place on a pair of spectacles, remain in any angular position to which they are adjusted by the wearer.

Another object of the present invention is to provide sunglasses of the clip-on type which expand peripherally for a substantial distance on either side and are readily attachable and detachable to the commonly worn types of spectacles.

Another object of the present invention is to provide clip-on sunglasses which are readily capable of adjustment to fit various types and shapes of eyeglasses.

It is also an object of the present invention to provide sunglasses adapted to fit on eyeglasses which are light in weight, durable, inexpensive, and attractive in appearance.

With the above and other objects in view, my invention resides in the novel features of form, construction, arrangement, and combination of parts presently described and pointed out in the claims.

In the accompanying drawing:

Figure 1 is a perspective view of clip-on sunglasses constructed in accordance with and embodying the present invention;

Figures 2 and 3 are top plan and front elevational views, respectively, showing the sunglasses fitted upon a pair of spectacles;

Figure 4 is a transverse sectional view of the sunglasses showing in dotted lines the relative position of the parts when in so-called "upswung" position; and Figure 5 is a fragmentary sectional view taken along line 5—5 of Figure 4.

Referring now in more detail, and by reference characters to the drawing, which illustrates a preferred embodiment of the present invention, 1 designates sunglasses of the clip-on type comprising a unitary or one-piece glare shield 2 fabricated of transparent synthetic plastic material having suitable light-filtering properties, and provided centrally of its lower margin with a recess 3 having somewhat the shape of an inverted V to fit over and clear the bridge of the wearer's nose, thereby dividing the glare shield 2 into two lens-portions 4, 5. The glare shield 2 is, furthermore, preferably molded to a gently curved surface contour in order to conform more comfortably and efficiently to the general contour of the wearer's face and forehead, and is provided with a short in-turned peripheral flange 6 for greater strength and rigidity and for preventing easy tearing thereof.

Rigidly mounted on, and extending around, the mid-section of the upper transverse margin of the glare shield 2 is a frame-bar 7 fabricated of relatively rigid Bakelite or similar material, and integrally provided with a pair of rearwardly projecting, longitudinally spaced bosses 8. Fixed in, and projecting from, the outwardly presented side faces of the bosses 8, are headed pintles 9 which extend loosely through quill portions 10 formed on the forward edge of the upper end of arc-shaped attachment clips 11 formed preferably of flexible metal and provided with forwardly curved central portions 12 adapted to clear the forward or hinged ends of temples 13 of a conventional pair of spectacles 14. It should be noted that the pintles 9 are axially inclined to each other and are somewhat resilient so as to apply additional friction or "pinch," so to speak, in the hinge as the glare shield is swung upwardly when in operative position upon a pair of spectacles, and the ends of the pintles 9 are upset or headed, as at 15, to retain the attachment clips 11 swingably in place thereon. Each of the clips 11 are integrally provided with suitably spaced pairs of prongs 16, 16', and 17, 17', extending radially inwardly for clip-on engagement with the rims of the spectacles 14. It will, of course, be understood that the attachment clips 11 will fit equally well upon rimless spectacles.

In use, the attachment clips 11 are spread apart to extend around the rims of the spectacles 14 and clip thereover, as shown in Figure 3, the flexible quality of the metal in the attachment clips 11 permitting necessary deformity of said strips for accommodating any shape of lens frame.

The wearer may also swing the glare shield 2 upwardly out of the line of vision without removing the sunglasses 1, and the "pinch" which develops in the hinge construction will hold the shield in any desired up-swung position. Thus, the sunglasses 1 may be optionally used either in downward position, as a sun-screen, or in upward position, as a sun-shade. It should be noted, however, that when the sunglasses 1 are not clipped upon a pair of spectacles the attachment clips 11 will swing loosely and freely. The position-retaining hinge friction or "pinch" uniquely results from the spring-like spread between the clips 11 as they engage the spectacle rims combined with the axially inclined relation between the pintles 9.

It will, of course, be apparent that a conventional spectacle frame containing lenses or light filtering oculars may be substituted for the glare shield or sun-screen 2, and, similarly, lenses, high-powered magnifiers, binoculars, binocular optical systems or a shatter-proof transparent protective shield may be mounted upon the frame bar 7, in lieu of the glare shield or sun-screen 2.

It should be understood that changes and modifications in the form, construction, arrangement and combination of the several parts of the sunglasses may be made and substituted for those herein shown and described without departing from the nature and principle of my invention.

Having thus described my invention, what I claim and desire to secure by Letters Patent is:

1. Clip-on sunglasses including, in combination, a glare shield provided centrally along its upper margin with a frame bar having projecting bosses, separate pintles mounted in and projecting from said bosses in a plane parallel to the plane of the glare shield, the inner ends of said pintles being upset, said pintles extending outwardly from their respective bosses at an angle to each other, and attachment clips having quill portions, said pintles extending loosely through said quill portions whereby said clips may be swung in relation to the glare shield, said clips being further provided with forwardly curved central portions whereby said glare shield is maintained in spaced relation to spectacles held by said clips when the shield is in downward position.

2. Clip-on sunglasses for use on a pair of spectacles including, in combination, a glare shield provided centrally along its upper margin with a frame bar having projecting bosses, separate pintles mounted in and projecting from said bosses in a plane parallel to the plane of the glare shield, the inner ends of said pintles being upset, said pintles extending outwardly and upwardly from their respective bosses with respect to the center of the frame bar and at an angle to each other, and resilient attachment clips having quill portions, said pintles extending loosely through said quill portions when the clips are disengaged from the spectacles whereby when the clips are pulled outwardly to accommodate spectacles the quill portions exert a binding tension on the pintles whereby the glare shield may be maintained at any selected angle with relation to the spectacles.

3. Clip-on sunglasses for use on a pair of spectacles including, in combination, a glare shield provided centrally along its upper margin with a frame bar having projecting bosses, separate pintles mounted in and projecting from said bosses, and attachment clips secured to each of said pintles, said pintles being disposed in a plane parallel to the plane of the glare shield, the inner ends of said pintles being upset, said pintles extending outwardly and upwardly from their respective bosses with respect to the center of the frame bar and at an angle to each other whereby upon movement of the glare shield the pintles will increasedly frictionally engage the attachment clips for maintaining said clips at any selected angle with relation to the shield.

4. Clip-on sunglasses for use on a pair of spectacles including, in combination, a glare shield provided centrally along its upper margin with a frame bar having projecting bosses, separate pintles mounted in and projecting from said bosses in a plane parallel to the plane of the glare shield, the inner ends of said pintles being upset, said pintles extending outwardly and upwardly from their respective bosses with respect to the center of the frame bar and being axially inclined to each other, and resilient attachment clips having quill portions, said pintles extending loosely through said quill portions when the clips are disengaged from the spectacles whereby when the clips are pulled outwardly to accommodate spectacles the quill portions exert a binding tension on the pintles whereby the glare shield may be maintained at any selected angle with relation to the spectacles.

WILLIAM A. MENDELSOHN.

REFERENCES CITED

The following references are of record in the file of this patent:

UNITED STATES PATENTS

| Number | Name | Date |
|---|---|---|
| 1,588,685 | Orriss | June 15, 1926 |
| 1,899,905 | Uhlemann | Feb. 28, 1933 |
| 2,132,346 | Richards | Oct. 4, 1938 |

FOREIGN PATENTS

| Number | Country | Date |
|---|---|---|
| 305,513 | Great Britain | Feb. 6, 1929 |